United States Patent [19]
Lapeyre

[11] 4,290,762
[45] Sep. 22, 1981

[54] MULTIPLE LINK TRANSMISSION CHAIN

[75] Inventor: James M. Lapeyre, New Orleans, La.

[73] Assignee: The Laitram Corporation, New Orleans, La.

[21] Appl. No.: 119,986

[22] Filed: Feb. 8, 1980

[51] Int. Cl.³ ............................................ F16G 13/02
[52] U.S. Cl. ..................................... 474/210; 59/7;
   59/85; 198/852; 403/3; 403/58
[58] Field of Search ............... 474/153, 154, 155, 156,
   474/202, 203, 206, 210, 211, 212, 213, 214, 215,
   216, 217, 273, 62; 198/851, 852, 853, 831, 834;
   59/7, 85; 403/58, 3

[56] References Cited

U.S. PATENT DOCUMENTS

| | | | |
|---|---|---|---|
| 2,297,813 | 10/1942 | Stork | 474/210 X |
| 2,499,030 | 2/1950 | Moon | 403/58 X |
| 2,586,268 | 2/1952 | Smith | 474/211 |
| 2,613,546 | 10/1952 | Jorgensen | 474/210 X |
| 2,618,922 | 11/1952 | Johnson | 59/85 |
| 2,893,540 | 7/1959 | Freeman | 474/210 X |
| 3,103,126 | 9/1963 | Textrom | 474/211 |
| 3,394,608 | 7/1968 | Johnson | 474/210 |
| 4,153,152 | 5/1979 | Lapeyre | 198/852 X |

FOREIGN PATENT DOCUMENTS 427452  4/1935  United Kingdom ............... 474/155

Primary Examiner—C. J. Husar
Assistant Examiner—Moshe I. Cohen
Attorney, Agent, or Firm—Weingarten, Maxham & Schurgin

[57] ABSTRACT

A multiple link transmission chain composed of interconnected identical links, having identical ends which are angularly disposed with respect to each other by 90 degrees in relation to the longitudinal axis.

8 Claims, 9 Drawing Figures

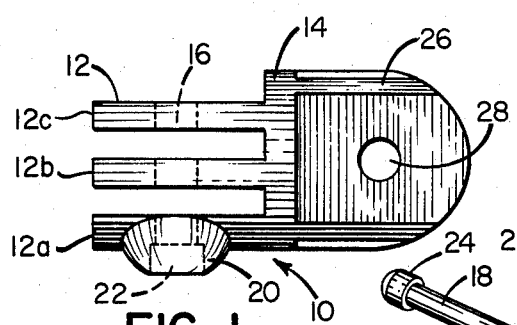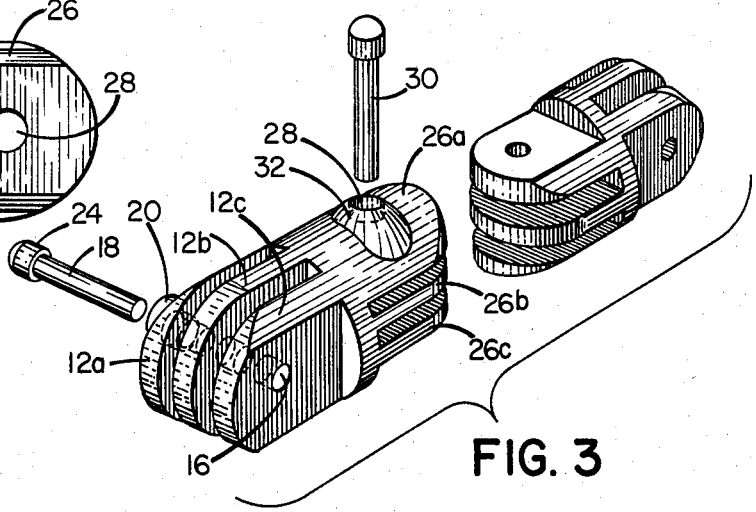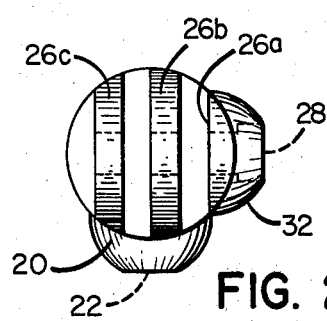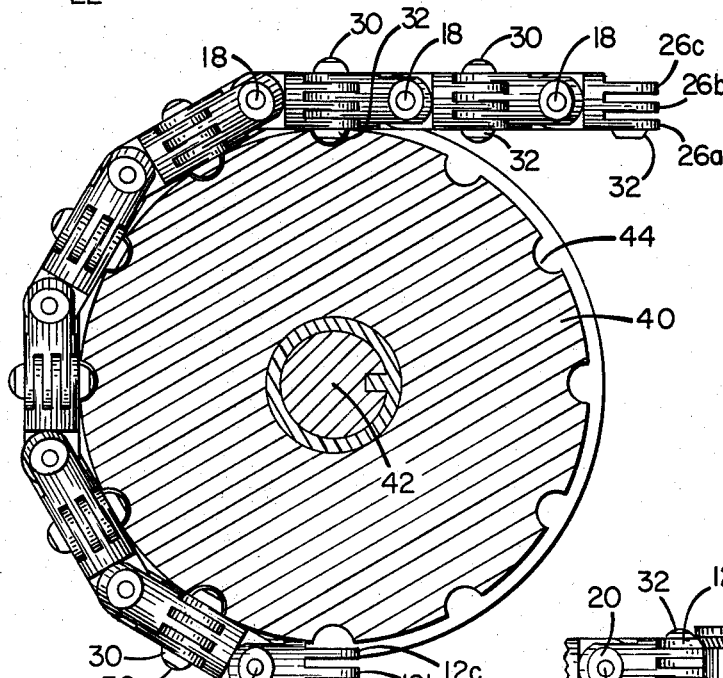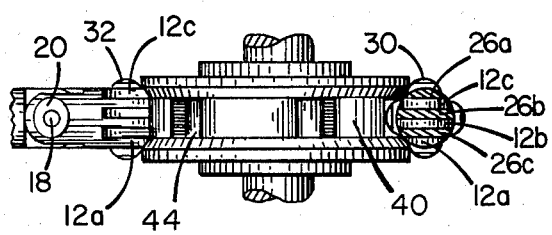

MULTIPLE LINK TRANSMISSION CHAIN

FIELD OF THE INVENTION

This invention relates to transmission chains, and more particularly to a multiple link transmission chain.

BACKGROUND OF THE INVENTION

Various forms of multiple link transmission chains are known and generally include links which are pivotally connected to like links by means of pivot pins to permit relative pivotable movement of adjacent links about the axis of the pivot pin. The chain is usually driven by a sprocket wheel in which sprocket teeth are arranged to engage the link ends through which the pivot pin is disposed for driving of the chain at the link ends.

A novel chain link is described in copending application Ser. No. 013,165, filed Feb. 21, 1979, entitled Link Chain Belt, in which a driving tooth on each link protrudes therefrom at a position intermediate the pivot axes at the link ends. The location of the driving tooth midway between the pivot axes and the configuration of the driving tooth surfaces, when employed in conjunction with an associated sprocket wheel of appropriate configuration, exhibits substantially low scrubbing action and small chordal action. Scrubbing action is known in relation to chain belts wherein the link teeth and sprocket teeth engage one another with a scuffing or rubbing contact. Chordal action in chain drives is also known and comprises a vibratory motion of the chain as it engages the sprocket wheel.

SUMMARY OF THE INVENTION

In brief, the present invention provides a multiple link transmission chain composed of interconnected identical links, each link having identical ends which are angularly disposed with respect to each other by 90 degrees with respect to the other link end. Either end of a link can mate with either end of other links, provide a readily assembled chain without the need for separately mating right or left ends, since all ends are the same, and any one is mateable to any one of the adjacent link ends. The links are pivotably interconnected to adjacent links, the pivot axes of each link being orthogonally disposed such that the link chain is movable bidirectionally through mutually-orthogonal planes.

A protrusion is formed on each link and symmetrically disposed about the respective pivot axes, to serve as a tooth for driving engagement with an associated sprocket wheel. The driving tooth is disposed midway between the pivot axes for a given direction of the motion. If the respective pivot axes of the link are defined as the horizontal and vertical axes, when the link chain is driven or moved in a vertical plane with the links being pivotable about the horizontal pivot axes, the tooth at the vertical axis which is disposed midway between the horizontal pivot axes is operative to be in driving engagement with the sprocket wheel. If the chain is being driven in a horizontal plane, with the links being pivotable about the vertical axes, the tooth at the horizontal axis midway between the vertical axes is in driving engagement with the sprocket wheel, which in this case is rotatable about a vertical axis.

DESCRIPTION OF THE DRAWINGS

The invention will be more fully understood from the following detailed description taken in conjunction with the accompanying drawings, in which:

FIG. 1 is a plan view of a link constructed according to the invention;

FIG. 2 is an end view of the link of FIG. 1;

FIG. 3 is a pictorial exploded view of a pair of links in position to be interconnected;

FIG. 4 is an elevation view of a link chain composed of the links of FIGS. 1-3 in engagement with a sprocket wheel rotatable about a horizontal axis;

FIG. 5 is a pictorial view of the link chain in engagement with a sprocket wheel rotatable about a vertical axis;

DETAILED DESCRIPTION OF THE INVENTION

Figure 6:
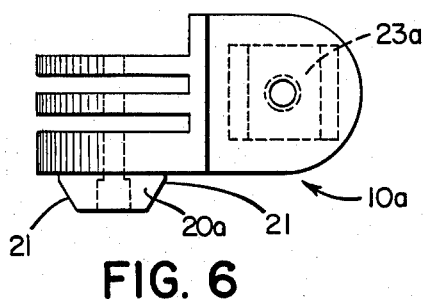
FIG. 6 is a plan view of an alternative link construction according to the invention.

The transmission chain constructed and operative in accordance with the invention is composed of interconnected links, each of which is of identical construction. Referring to the drawing and particularly FIGS. 1-3, the link 10 is of generally cylindrical form having oppositely extending portions which are of the same construction but rotated about the longitudinal axis of the link by 90 degrees. Thus, as seen in FIG. 1, the left-hand portion of link 10 includes an array of spaced parallel members 12 which outwardly extend from a central link portion 14. The member 12a has a curved outer surface following the cylindrical contour of the link. An edge portion of member 12c is also curved to follow the cylindrical link contour. The distal ends of members 12 are curved about the radius of a center line through openings 16 provided in alignment through members 12. These aligned openings 16 accommodate a pivot pin 18 for pivotal interconnection to a pivot pin 18 for pivotal interconnection to a mated adjacent link.

A head or protrusion 20 of spherical surface configuration is provided on the outer surface of member 12a and which symmetrically surrounds aligned openings 16. The head 20 includes an enlarged opening 22 for accommodation of the head portion 24 of pivot pin 18. The protrusion 20 serves as a driving tooth and is adapted to mate with sprocket holes of an associated sprocket wheel, as will be described.

The opposite end of each link 10 also includes a spaced array of parallel members 26 which extend oppositely from central portion 14 to the array of members 12. Aligned openings 28 provided through members 26 accept a pivot pin 30 which can be identical to pivot pin 18. A driving tooth 32, like tooth 20, is provided on the outer surface of member 26a to form an outward protrusion surrounding aligned openings 28. The head of pivot pin 30 is accommodated within an enlarged recess provided in tooth 32, as with the tooth 20. The distal ends of members 26 are curved about the axis of aligned openings 28. It is seen that the respective ends of each link 10 are identical and are rotated about a longitudinal axis of the link by 90 degrees with respect to each other. Since the pivotal axes of each link are displaced with respect to each other by 90 degrees, bidirectional flexibility is provided of a chain composed of the interconnected links 10.

Each end of a link 10 can be mated with either end of an adjacent link, and the interconnected links form a chain of generally cylindrical configuration which appears somewhat as a rope and which is nearly as flexible as a rope because of the bidirectional flexibility provided by the orthogonally disposed pivot pins on each link of the chain. The spaced members 12 and 26 are of width and spacing to be in rotatable sliding contact with the contiguous members of mated links.

An important feature of the novel transmission chain is that the driving tooth is disposed midway from the pivots being employed for a given axis of rotation. Thus, if the pivots are alternately defined as horizontal and vertical pivots, the vertical teeth are employed for driving the chain when it is pivotable about a horizontal axis, while the horizontal teeth are employed for driving the chain when it is pivotable about a vertical axis. Referring to FIG. 4, there is shown a vertical sprocket wheel 40 which is rotatable about a horizontal axis defined by axle 42 to which the sprocket wheel is keyed. The sprocket wheel 40 includes an equi-spaced array of recesses 44 which are adapted to mesh with the teeth 20 and 32 of the links 10. For rotation in the vertical plane, as illustrated in FIG. 4, the chain links are pivotable about axes defined by horizontal pivot pins 18, and the teeth 32 which are midway between the pivot pins 18 are in mesh with the recesses 44 of the sprocket wheel 40 for driving engagement of the chain. For movement in an orthogonal plane, as depicted in FIG. 5, in which the links pivot about vertical pins 30, the chain is driven by engagement of the teeth 20 with the recesses 44 of the associated sprocket wheel 40.

Figure 7:
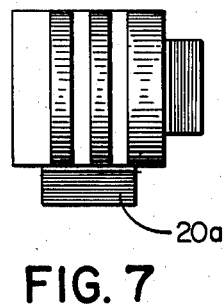
FIG. 7 is an end view of the link of FIG. 6.
Figure 8:
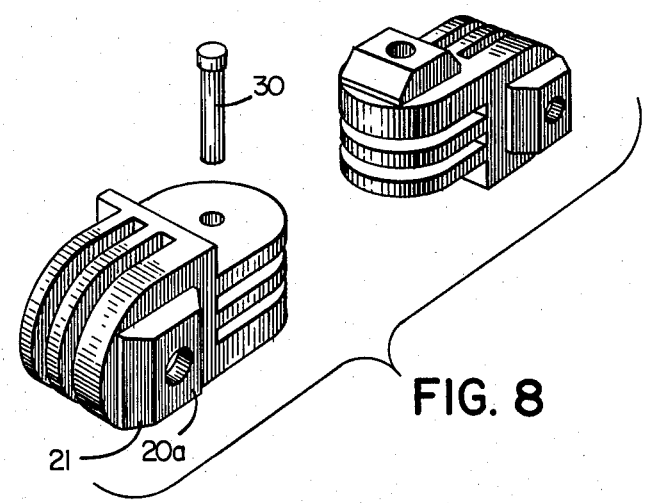
FIG. 8 is a pictorial exploded view of a pair of the links of FIGS. 6 and 7 in position to be interconnected.
Figure 9:
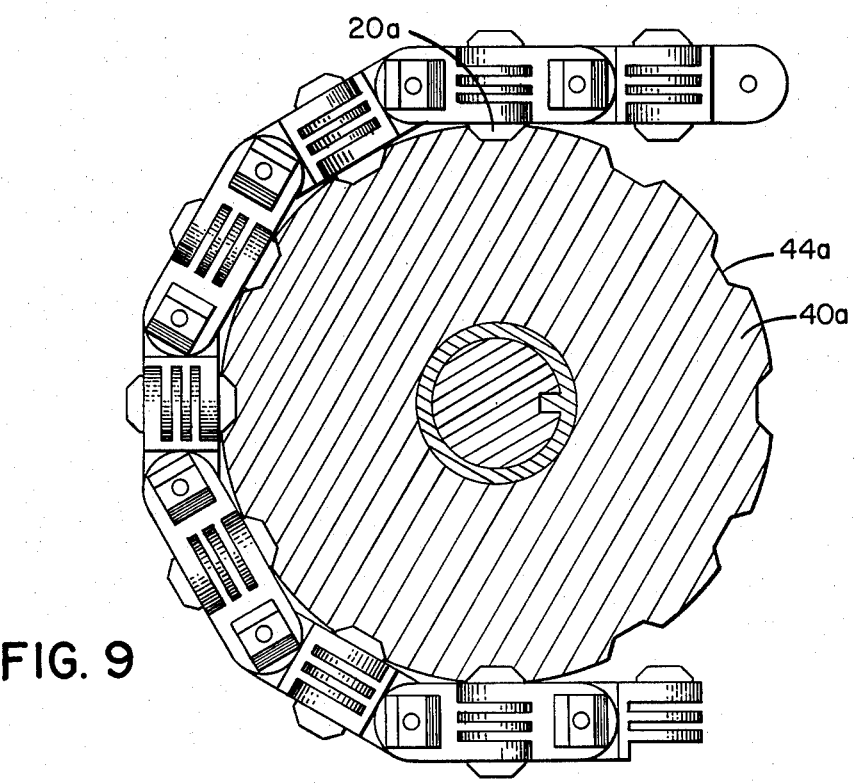
FIG. 9 is an elevation view of a link chain in engagement with a sprocket wheel and composed of the links of FIGS. 6-8.

A variation of the link construction is shown in FIGS. 6–8. In this latter construction, the links 10a are of generally square cross-section, and the teeth 20a and 32a have planar facets 21, which provide the driving surfaces which are cooperative with an associated sprocket wheel. The interconnected links and associated sprocket wheel are depicted in FIG. 9. The sprocket wheel 40a includes faceted recesses 44a, which are adapted to mesh with the teeth 20a and 32a of the links 10a. The construction and operation of the links 10a are otherwise as described in the embodiment of FIGS. 1–5.

The invention is not to be limited by what has been particularly shown and described except as indicated in the appended claims.

I claim:
1. A multiple link chain composed of a plurality of identical links, each comprising:
    a link body having a longitudinal axis and first and second link ends spaced along the axis, each identical to the other and each angularly disposed with respect to the other about the axis by 90 degrees;
    each link end having a plurality of spaced members extending along the axis;
    an opening in each of said members aligned along an axis orthogonal to the longitudinal axis, the orthogonal axis of one link end being orthogonal to the axis of the other link end; 'said aligned openings through said members accepting a pivot pin;
    a protrusion at each link end and each outwardly extending from the outer one of the associated spaced members, each symmetrically disposed about the associated orthogonal axis and adapted for driving engagement with a sprocket wheel; and
    each of said link ends being mateable to either link end of adjacent links by interdigitated connection of the spaced members of the adjacent links.

2. The multiple link chain of claim 1 wherein the first and second link ends are curved about a radius of a center line through the openings of said spaced members.

3. The multiple link chain of claim 1 wherein said link body is of generally cylindrical form and wherein the outer ones of said spaced members have curved outer surfaces conforming to the cylindrical contour of the link.

4. The multiple link chain of claim 1 wherein the outer ones of said spaced members have an outer surface flush with the surface of the link body.

5. The multiple link chain of claim 1 wherein the spaced members are of a width providing rotatable sliding contact with the confronting surfaces of the spaced members of adjacent mated links.

6. The multiple link chain of claim 1 wherein the outer one of the spaced members for each link end has an outer surface flush with the outer surface of the link body, and a spaced member which is disposed inward along the orthogonal axis by an amount to accommodate the outer spaced member of an adjacent link.

7. The multiple link chain of claim 6 wherein the protrusions on the outer ones of said spaced members are of spherical surface configuration.

8. The multiple link chain of claim 7 wherein each of said protrusions includes an enlarged opening for accommodation of the head portion of said pivot pin disposed in said aligned openings.

* * * * *